United States Patent
Yamamoto et al.

(10) Patent No.: US 7,311,833 B2
(45) Date of Patent: Dec. 25, 2007

(54) ZERO EXCESS SLUDGE MEMBRANE BIOREACTOR

(76) Inventors: Kazuo Yamamoto, 2-5-11, Shimorenjaku, Mitaka-shi, Tokyo 181-0013 (JP); Chuan-Hong Xing, 25 Hancock Crescent, Tronto, Ontario (CA) M1R 2A2

( * ) Notice: Subject to any disclaimer, the term of this patent is extended or adjusted under 35 U.S.C. 154(b) by 259 days.

(21) Appl. No.: 11/070,134

(22) Filed: Mar. 1, 2005

(65) Prior Publication Data

US 2005/0194310 A1    Sep. 8, 2005

Related U.S. Application Data

(60) Provisional application No. 60/549,856, filed on Mar. 3, 2004.

(51) Int. Cl.
 *C02F 3/30* (2006.01)
 *C02F 3/12* (2006.01)
(52) U.S. Cl. ............ 210/603; 210/604; 210/623; 210/195.2; 210/197; 210/259
(58) Field of Classification Search ........ 210/603–605, 210/623, 630, 195.1, 195.2, 197, 252, 259, 210/629
See application file for complete search history.

(56) References Cited

U.S. PATENT DOCUMENTS

| | | | | |
|---|---|---|---|---|
| 5,538,631 A | * | 7/1996 | Yeh ........................ | 210/221.2 |
| 5,616,241 A | * | 4/1997 | Khudenko ................ | 210/151 |
| 5,904,850 A | * | 5/1999 | Vellinga .................. | 210/603 |
| 6,007,712 A | * | 12/1999 | Tanaka et al. ........... | 210/151 |
| 7,011,757 B1 | * | 3/2006 | Reid ........................ | 210/605 |
| 2003/0098277 A1 | * | 5/2003 | Khudenko ................ | 210/601 |
| 2003/0159988 A1 | * | 8/2003 | Daigger et al. .......... | 210/605 |
| 2006/0008865 A1 | * | 1/2006 | Cote et al. ................ | 435/34 |
| 2006/0081534 A1 | * | 4/2006 | Dimitriou et al. ....... | 210/620 |
| 2006/0201876 A1 | * | 9/2006 | Jordan ..................... | 210/609 |
| 2006/0213831 A1 | * | 9/2006 | Dimitriou et al. ....... | 210/620 |

FOREIGN PATENT DOCUMENTS

| JP | P2002-102662 | * | 4/2002 |
|---|---|---|---|
| KR | 2002051349 | * | 6/2002 |

* cited by examiner

*Primary Examiner*—Fred G. Prince
(74) *Attorney, Agent, or Firm*—Christensen O'Connor Johnson Kindness PLLC

(57) ABSTRACT

An inclined plate coupled membrane bioreactor for treating feed water having excessive level of nutrients in particular chemical oxygen demand and total nitrogen and suspended solids has an aerobic bioreactor for nitrification and aerobic biodegradation in which membranes are submerged for permeate extraction, and an anoxic bioreactor for denitrification within which the inclined plates are outfitted to confine as much anoxic sludge as possible. An air oxygenating and an air scouring are continuously provided to the aerobic bioreactor to maintain a desired aerobic environment and to mitigate membrane fouling while an intermittent air blowing is provided to the anoxic bioreactor to blow out gaseous content generated through denitrification and to rectify the uniformed flow along the inclined plates. The aerobic sludge is recycled to the lower compartment of anoxic bioreactor and the supernatant of anoxic bioreactor is collected as weir effluent and delivered to the downstream aerobic bioreactor. Permeate is intermittently extracted from the membranes by a suction pump. There is no excess sludge withdrawn from the inclined plate coupled membrane bioreactor throughout the experiment.

16 Claims, 12 Drawing Sheets

US 7,311,833 B2

ZERO EXCESS SLUDGE MEMBRANE BIOREACTOR

RELATED APPLICATIONS

This application claims the benefit of U.S. Provisional Application Ser. No. 60/549,856 filed Mar. 3, 2004.

FIELD OF THE INVENTION

The present invention relates to a process and apparatus for biologically treating municipal, industrial, agricultural or other wastewaters with a zero excess sludge membrane bioreactor, involving the integration of the inclined plates and bioreactor and membrane filtration. Such a design according to the present invention can not only save much space by eliminating the use of secondary clarifier and sludge treatment facilities, but also significantly reduce the total operating cost of a wastewater treatment plant by saving the excess sludge treatment/disposal cost. More specifically, the invention concerns the removal of nutrients (e.g., carbonous and nitrogenous) in membrane coupled anoxic and aerobic bioreactors through continuous nitrification and denitrification. In a broad sense, this invention can also be applied to other suspended growth fermentation systems or the like, where solid-liquid separation is employed.

BACKGROUND OF THE INVENTION

With increasing public concerns on our environment and more stringent environmental legislations, excess sludge disposal involved biosolids management has been becoming an ever-tough challenge in developed countries such as Canada, USA, EU countries and Japan. From the concept of cleaner production and the vision of sustainable development, great effort should be made to develop some new process that can not only achieve satisfactory nutrient removal but also produce less or more ideally, zero excess sludge.

Excess sludge is often generated in the process of biological treating of wastewaters containing excessive nutrients such as chemical oxygen demand (COD), suspended solids and total nitrogen in the form of proteins and ammonia. Under aerobic conditions, carbonous nutrient can be easily oxidized to carbon dioxide and water while the biological removal of total nitrogen is subject to alternate nitrifying and denitrifying process. During the aerobic nitrification, primarily the ammonia oxidizing bacteria firstly convert ammonia to nitrite and the nitrate oxidizing bacteria further oxidize nitrite to nitrate. During the anoxic denitrification (preferably dissolved oxygen less than 0.5 mg/L), nitrate is converted to nitrogen gas by a group of denitrifying bacteria. In practice, nitrification and denitrification may be engineered as either two compartments within a single tank (i.e., aerobic zone and anoxic zone) or two separate tanks (i.e., aerobic tank and anoxic tank) connected by a recycle line. The final treated water is subsequently collected in the form of supernatant after gravity sedimentation, a proven less effective unit process for solid-liquid separation. In order to improve the quality of treated water, ultraporous or microporous membranes have been recently submerged in the aerobic compartment or the aerobic tank with a vacuum suction applied to one side of membranes. For those cross-flow inside-out membranes, however, a side-stream design may be a more viable option in the treatment of various wastewaters. In both cases, clean water permeates out of membrane walls but impurities such as bacteria and suspended solids are confined within the bioreactor. To mitigate fouling tendency, membranes are usually kept awash by scouring air bubbles for submerged membrane bioreactors or high-speed circulation for side-stream installations. To maintain a desired sludge retention time (SRT), certain amount of excess sludge has to be wasted continuously or intermittently, depending on actual operational requirement of process design although the excess sludge itself is not 'excessive' from the microbiological metabolism point of view.

U.S. Pat. No. US6,616,843 Dl describes a single tank membrane bioreactor in which both aerobic and anoxic biodegradations prevail alternately at an average SRT between 10 days and 30 days. According to the invention, nutrients removal in terms of COD and total nitrogen is proven satisfactory during the seven months of operation with a feed of actual municipal wastewater. Two obvious drawbacks are (a) loss of purification capacity due to the alternate aerobic-anoxic conditions, and (b) large amount of excess sludge produced due to the short SRT of only 10 days to 30 days.

Australian Patent Application No. AU2003210073 discusses an improvement tailored to remove the drawback of 'capacity loss due to the alternate aerobic-anoxic conditions'. To this end, the membrane bioreactor for wastewater purification, comprising a upper compartment with membranes where purification takes place under aerobic condition and lower compartment where anoxic condition prevails in which a mixture of activated sludge and said wastewater circulates between the two compartments is characterized in that the anoxic compartment is placed in direct communication with and below the aerobic compartment. Therefore, an optimum mixing of wastewater and sludge throughout the content of the reactor that enables better continuous contact between bacteria and nutrients and thus avoid the loss of capacity due to intermittent aerobic-anoxic operation mode. However, large amount of excess sludge still needs to be wasted from the bioreactor to operate membrane bioreactor at designed SRT. U.S. Pat. No. US6,086,766 introduces ozone treatment of recycled sludge to achieve zero excess sludge discharge by ozonation of 2.5-3.5 times, preferably 2.8-3.4 times amount of the formed excess sludge in conventional aerobic treatment without the use of membrane separation. However, the energy cost associated with ozone generation is extremely expensive. Focused on the sludge reduction, Australian Patent Application No. AU20032 12695 combines alkaline (e.g., NaGH and Ca(OH)2) and ozonation as a pretreatment step to improve sludge's biodegradability prior to membrane bioreactor. Recently, US Patent Application Publication No. US2005/0023202 employs thermal hydrolysis at temperature 50° C.-100° C. and neutralization for sludge pretreatment to offer more biodegradable feed to subsequent membrane bioreactor. However, both the addition of chemicals and heating up large volume of excess sludge are very costly and impractical for a full-scale wastewater treatment plant.

To date, the design and operation of a membrane bioreactor can hardly takes zero excess sludge (namely, SRT approaches the infinite) as an option, because all the existing membrane modules worldwide are not able to handle extremely high sludge concentrations beyond 10 g/L-20 g/L in term of mixed liquor suspended solids (MLSS) due to serious membrane fouling and frequent membrane cleaning and remarkable energy consumption relating to intensive air scouring and oxygenating. In addition, intensive air scouring deteriorates permeate extraction in both quality and quantity.

SUMMARY OF THE INVENTION

An object of the present invention is to provide a cost-effective membrane bioreactor that can not only achieve high yield of permeate having acceptable levels of COD and nitrogenous compounds but also produce zero excess sludge, comprising a compact aerobic bioreactor in which membrane or membranes are submerged and satisfactory ammonia nitrification and COD removal took place and an acceptable sludge concentration less than 10 g/L as MLSS is, subject to actual wastewater quality and hydraulic retention time (HRT), maintained during the long term membrane filtration, and an anoxic bioreactor within which a high anoxic sludge concentration greater than 10 g/L as MLSS is, subject to actual wastewater quality and HRT, preferred for desired denitrification through employing a movable inclined plate or plates at its upper compartment. In particular, feed water combined with recycled aerobic sludge is pumped to the bottom of anoxic bioreactor and completely mixed with anoxic sludge therein, while the supernatant together with certain amount of anoxic sludge is overflowed downwards to the aerobic bioreactor via a weir, thus offering continuous nitrification and denitrification in one process.

Another object of the present invention is to provide a cost-effective inclined plate or plates coupled anoxic bioreactor in which the angle of inclined plate or plates are adjustable according to actual requirement for settling efficiency. Such an inclined plate or plates coupled bioreactor or its variants may be further applied to other similar settings where a solid-liquid separation is required.

To accomplish above and other objects, the present invention is translated to a process for purifying feed water with excessive nutrients containing unacceptable level of COD and total nitrogen and suspended solids in two connected bioreactors, namely, anoxic bioreactor and aerobic bioreactor.

Wherein said anoxic bioreactor comprises: (a) a tank for holding mixed liquor to be processed, in particular, the mixture of feed water (e.g., wastewater), recycled aerobic sludge and anoxic sludge; (b) two compartments, namely the upper settling compartment and the lower storage and mixing compartment; (c) a combined or separate feed inlet from which the feed water (e.g., wastewater) and recycled aerobic sludge are delivered to the lower compartment of said anoxic bioreactor; (d) a single plate or an array of movable inclined plates evenly placed at the upper anoxic bioreactor; (e) a coarse bubble blowing device positioned below and between herein stated plates and subject to actuation between ON and OFF states; (f) an outlet in the form of a single weir or multiple weir system; (g) a horizontal holed plate flow regulator or distributor if required; and (h) a single or an array of vertical diversion walls that are correspondingly arranged right below each inclined plates if required.

Wherein said aerobic bioreactor comprises: (a) a tank for holding mixed liquor to be processed, in particular, the mixture of aerobic sludge cultured in situ and the weir effluent from upstream anoxic bioreactor; (b) an outlet from which certain amount of aerobic sludge is recycled to the upstream anoxic bioreactor; (c) at least one membrane with its first side in fluid communication with mixed liquor in the said tank and a second side in fluid communication with a header or headers as designed; (d) a source of negative pressure to the header, typically the vacuum suction; (e) a coarse bubble scouring device; (f) a fine bubble oxygenating that is ON/OFF supply actuatable positioned at the lower aerobic tank; and (g) a top seal or hood to collect $O^2$-depleted air that can be further utilized for coarse bubble blowing to the anoxic bioreactor if required.

The present invention is further directed at a process wherein the coarse bubble blowing supply, located between the upper settling compartment and the lower storage and mixing compartment, intermittently provides large bubbles to blow nitrogen gas out of the anoxic bioreactor and to rectify uniformed counter flows along those inclined plates. In order to maintain a desired anoxic environment, more preferably, the $O_2$-depleted air from the top of aerobic bioreactor can be reused as a source of air blowing at pre-selected ON/OFF cycles.

The present invention is also aimed at a process wherein the membrane scouring air supply, located right below membrane or membranes, continuously provide large sized scouring bubbles to clean the membranes and to improve sludge mixing by producing airlift effect. Large sized bubbles are generally not able to transfer sufficient dissolved oxygen to mixed liquor to create a typical aerobic environment throughout the bioreactor. Thus, an additional oxygenating is mandatorily operated and provides fine bubbles of air or pure oxygen to maintain a designed level of dissolved oxygen or oxidation-reduction potential. In particular, the oxygenating bubble supply is actuated or terminated if the dissolved oxygen is beyond the range of controlled level of oxygen in the aerobic reactor.

DETAILED DESCRIPTION OF THE PREFERRED EMBODIMENT

Figure 1:
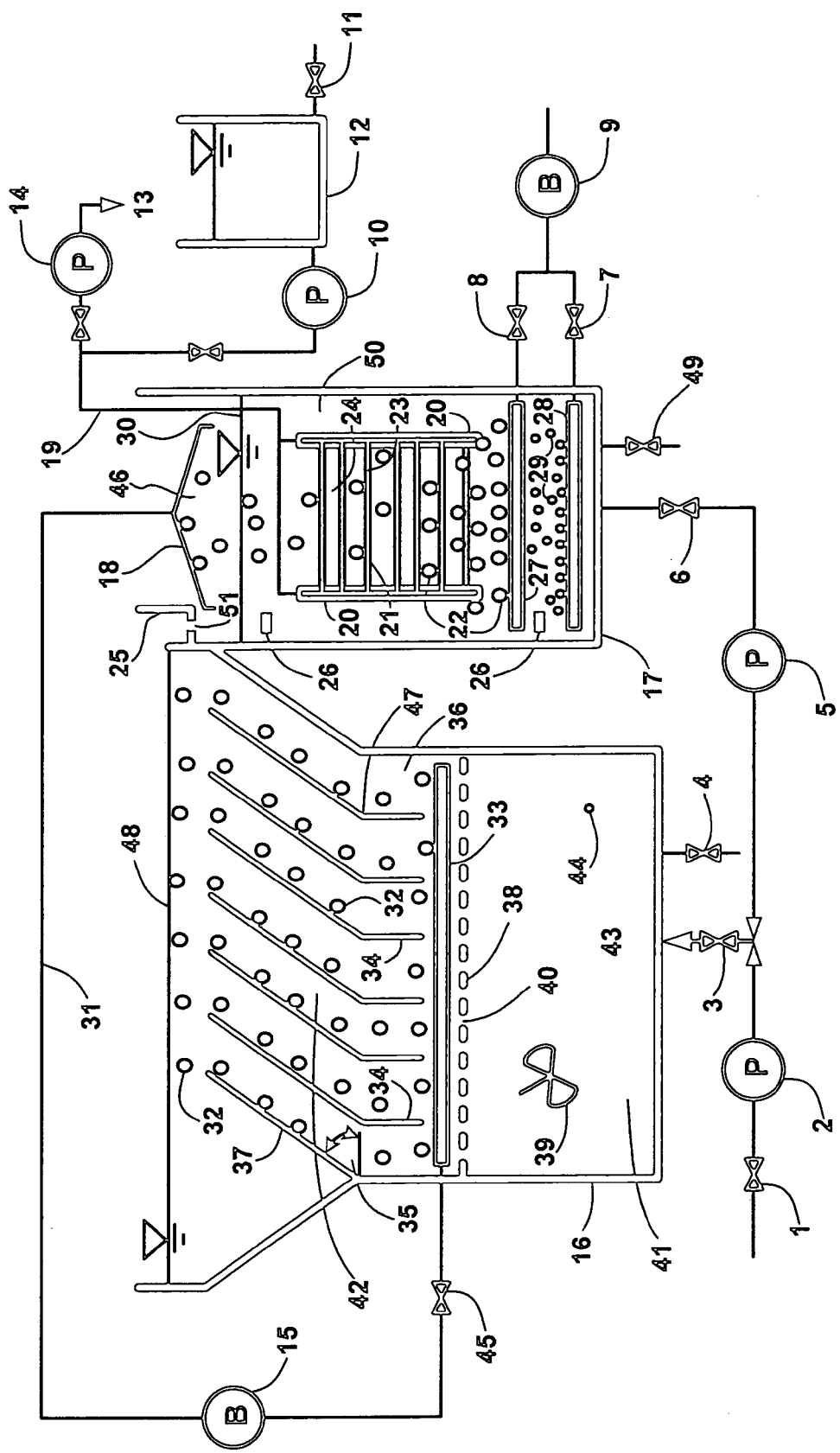
FIG. 1 is a representation of a process according to an embodiment of the invention.

Referring to FIG. 1, shown therein is a process designed in accordance with a preferred embodiment of the present invention, comprising anoxic bioreactor 16, aerobic bioreactor 17, permeate tank 12 and other required parts and conduits for interconnection and process control etc. The anoxic bioreactor 16 has a tank that is initially filled with feed water 1 and seeding sludge through an inlet 3 by a feed pump 2. The feed water 1 is typically delivered to the anoxic bioreactor 16 through either a bar screen or a fine screen or screen banks not illustrated therein to comb out those large sized stuff in order to prevent the feed pump 2 from serious clogging during the long-term operation. Alternatively, the feed water 1 may be transported to the anoxic bioreactor 16 by gravity flow depending on the altitudinal arrangement of certain treatment plant. At the inlet 3, feed water 1 is combined and mixed with the recycled aerobic sludge 6 that is recycled back from the downstream aerobic bioreactor 17 through a circulation pump 5. Optionally, the recycled aerobic sludge 6 may be pumped to the anoxic bioreactor 16 through a second inlet not illustrated without any mixing with the feed water 1 prior to entering the anoxic bioreactor 16. The anoxic bioreactor 16 has two compartments, namely the upper compartment 42 mainly for sedimentation and the lower compartment 41 mainly for storage of settled sludge and initial mixing. In between is a holed plate flow regulator 38 to provide a uniformed upflow to the diversion walls 34 at the foot of inclined plates 37, wherein the plate regulator 38 has a hole 40 size of 5 mm to 100 mm, more typically 10 mm to 50 mm in diameter. The said plate flow regulator 38 is however optional and subject to specific applications.

Figure 2:
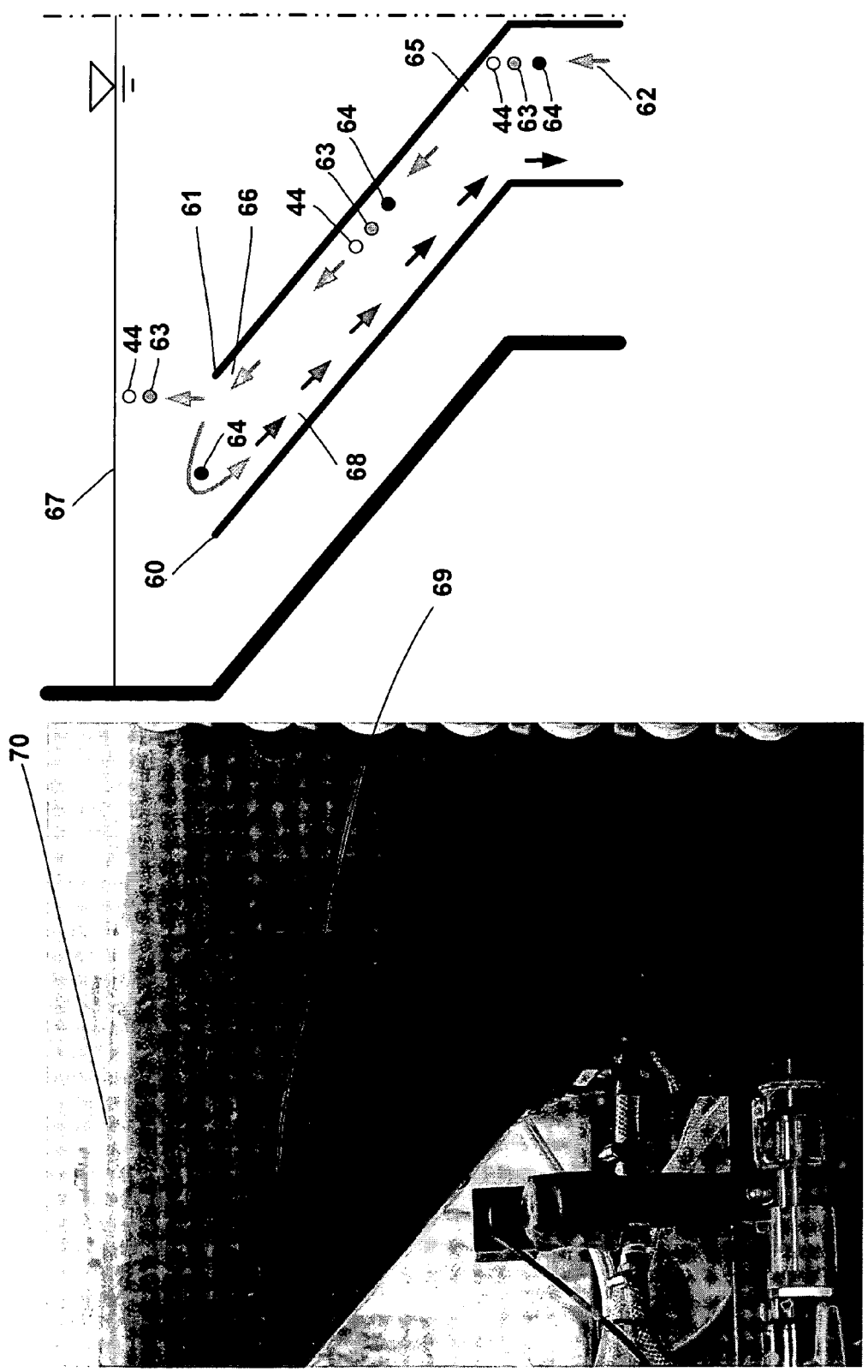
FIG. 2 is a graphic description of a typical flow pattern in-between two adjacent inclined plates according to an embodiment of the invention.

After the inlet 3, feed water 1, recycled aerobic sludge 6 and the seeding sludge in anoxic bioreactor 16 are mixed by natural confluence or by a slow agitator 39 or by the likes if required. In the absence of sufficient dissolved oxygen, the said mixed liquor turns anoxic and redefined as anoxic sludge 43 thereinafter. In order to achieve higher denitrification, dissolved oxygen is typically kept less than 0.5 mg/L, more preferably within the range of 0.0 mg/L-0.3 mg/L in the anoxic bioreactor (16). However, the actual level of dissolved oxygen is subject to the amount of dissolved oxygen carried by the recycled aerobic sludge 6 and the oxygen consumption rate by anoxic sludge 43 or and specific recycle ratio selected in the art and may vary for different installations. As a result of sludge settling at the upper compartment 42, the concentration of anoxic sludge 43 becomes extremely high at the lower compartment 41, thus making denitrification occurred thoroughly and continuously. Depending on the load of total nitrogen in feed water 1 and the nitrification in the aerobic bioreactor 17, certain amount of nitrogen gas bubbles 44 may be observed within the concentrated anoxic sludge 43. Passing through a plate flow regulator 38, the anoxic sludge 43 together with those bubbles 44 arrives at the diversion walls 34, through which it is further distributed evenly among corresponding inclined plates 37. The space between two adjacent diversion walls 34 herein stated is typically between 10 mm and 500 mm, preferably in the range of 50 mm to 100 mm, thus allowing smooth upflow formed in between diversion walls 34. Right below diversion walls 34, a coarse bubble diffuser 33 is outfitted to provide large bubbles 32 to blow out the accumulated nitrogen gas bubbles 44 generated by anoxic denitrification throughout the whole anoxic bioreactor 16. In addition, the intermittent air blowing is helpful to form uniformed upflow 62 along the lower side of the inclined plates (see FIG. 2). A source of air, preferably the oxygen-depleted air 46, is delivered to the coarse bubble diffuser 33 by an inline blower 15 through a pipeline 31 and a valve inlet 45 in an intermittent mode. The mode of actuation subject to specific process design is recommended as 1 min-30 min ON followed by 10 min-120 min OFF, and more typically 2 min-10 min ON and 30 min-60 min OFF. The coarse bubbles diffuser 33 preferably supply bubbles having an average diameter of 1 mm to 50 mm, and more preferably between 5 mm and 10 mm. At this size, the coarse bubbles 32 flow rapidly upwards along the lower sides of inclined plates 37 to provide effective cleaning and to blow out said nitrogen bubbles 44 but little oxygen transferred into anoxic sludge 43 even taking fresh air as a source of gas blowing supply, due to the fact that large sized blowing bubbles 32 have a reduced surface area to volume ratio compared with smaller ones that further undermines oxygen transfer. Further, large sized blowing bubbles 32 tend to float up quickly and burst whereas smaller bubbles like the nitrogen bubbles 44 produced by anoxic denitrification more easily get entrained in the anoxic sludge 43.

At the foot of inclined plates 37, a mechanism of moving 47 is enabled to adjust the inclined angle 35 between 0 degree and 180 degree, preferably between 30 degree and 150 degree. The said mechanism 47 may be realized by but not limited to a hinge or an axis or other bendable material or the likes. Variation of inclined angles 35 provides an adjustable projection area for facilitated sedimentation of anoxic sludge 43 on to the inclined plates 37, thus rendering the anoxic bioreactor 16 resistant to shock loadings to a large extent. On the other hand, it prevents serious pileup of anoxic sludge 43 at the foot of inclined plates 37 through the upflow washing and coarse bubble blowing. The inclined plates 37 are typically moved from the inclined angle 35 to its supplementary angle, depending on actual situation of application environment. The anoxic sludge 43 settles onto the inclined plates 37 in accordance with two mechanisms, i.e., natural sedimentation and counterflow formation, wherein the former is further improved by the use of inclined plates 37 particularly through the increase of effective settling area while the latter can be explained as FIG. 2. With the upward flow 63 of anoxic sludge 43 (see FIG. 1), the entrained nitrogen gas 44 together with other gaseous content approaches the lower side 65 of the foot of inclined plate 61 at the fastest velocity, leaving behind the liquid content 63 of the anoxic sludge 43 and then the solid content 64. At the lower side 66 of the head of inclined plate 61, gaseous content and water are released to the top surface 67 while the solid content 64 of anoxic sludge 43 is rolled back to and further pressed down by gravity along the upper side 68 of another inclined plate 60. The concentrated anoxic sludge finally sinks down to the lower storage compartment 41 of the anoxic bioreactor 16 (see FIG. 1). As evidence, at the lower side of inclined plate (37) is observed the transparent water layer 69 while another transparent water layer 70 is formed on the top surface 67.

Now again referring to FIG. 1, the top supernatant 48 flows down to the aerobic bioreactor 17 by gravity via weir 25, shown therein is the said reactor 17 fabricated in accordance with a preferred embodiment of the present invention. The aerobic bioreactor 17 has a recycled aerobic sludge outlet 6, a drain outlet 49 for maintenance check, an oxygenating air inlet 7 and a scouring air inlet 8. These two air inlets share the same source of air provided by a blower 9 or have independent blowers not illustrated. To keep the water surface 30 of aerobic bioreactor 17 constant, installed are level sensors 26 which are connected with feed pump 2. A membrane module 24 submerged into the reactor 17 has right and left headers 20 in fluid communication with the lumens 23 of hollow fiber membranes 21. In the mode of filtration, the aerobic bioreactor 17 remains filled with the mixture of aerobic sludge 50 and weir effluent 51 to a level 30 under which are membranes 21 by actuating feed pump 2 to supply feed water 1 as designed.

The membranes 21 preferably have an average pore size between 0.001 microns and 100 microns and more typically have an average pore size between 0.01 microns and 1 micron. Candidate membranes include those manufactured by Mitsubishi Rayon and sold under the trademark STERAPORE but other submerge-enabled outside-in membranes may be employed such as those manufactured by Zenon Environmental Inc. or Kubota. Optionally, those side-stream inside-out membranes manufactured by TAMI or US Filter may be employed by introducing side loops outside the aerobic tank 17. For submerged applications, membranes 21 are placed at least 100 mm below the surface level 30 and at least 200 mm from the bottom of aerobic tank 17. From the viewpoint of saving suction energy, deeply submerged membranes 21 are preferable because the positive static water pressure to membrane headers 20 can be utilized. In a broad sense, membranes 21 may be located in the middle or along one sidewall or the bottom of aerobic reactor 17, depending on specific reactor configuration and membrane module orientation.

Permeate 13 is intermittently sucked out by pump 14 through the permeate line 19 that is connected to both membrane headers 20. The pump 14 is operated in a 2-minute OFF and 10-minute ON mode. Negative suction provides a transmembrane pressure across the fiber walls of membranes 21. Driven by the pressure, only permeate is passing through the membrane walls into the lumens 23 while the aerobic sludge 50 is rejected by the size exclusion. The filtered permeate 13 is optionally stored in the permeate tank 12 or released through an outlet 11, or may be reused as a source of membrane backwash or inline cleaning water for pump 10 in a reverse direction to the permeate suction if required.

Air scouring is continuously created by a large bubble diffuser 27 connecting to scouring air inlet 8, which is located right below and in close proximity to the membrane module 24. The scouring air bubbles 22 have an average diameter between 1 mm and 50 mm, and more typically have an average between 5 mm and 10 mm. Such a size range has been proven much more cost-effective for scouring membranes 21 but deliver very limited oxygen to the aerobic sludge 50. The air scouring also produces an airlift effect to improve the mixing within the aerobic bioreactor 17. Optionally, a hood 18 is placed at least 20 mm above the water level 30 to collect and transfer the said oxygen-depleted air 46 through the line of intermittent air blowing 31 to the anoxic bioreactor 16.

Aerobic conditions are necessary for deep nitrification and rapid removal of COD. To create an aerobic environment, an oxygenating fine bubble diffuser 28 is installed below the membrane module 24, preferably at the bottom of aerobic bioreactor 17. The said oxygenating diffuser 28 is connected to the oxygenating air inlet 7 and produces small bubbles 29 to transfer free oxygen to the aerobic sludge 50 as much as possible. If the membrane module 24 is located at one sidewall of the aerobic bioreactor 17, the oxygenating diffuser 28 is then preferably positioned at the bottom of the same sidewall of the said reactor 17. However, if the membrane module 24 is located in the center of the said bioreactor 17, the oxygenating diffuser 28 is then preferably fixed at the center of the bottom of the said reactor 17. The oxygenating bubbles 29 are preferably small, typically with an average diameter between 0.5 mm and 5 mm, to provide efficient oxygen transfer to the aerobic sludge 50. The said bioreactor 17 is considered aerobic at a dissolved oxygen greater than 0.5 mg/L although a range between 0.5 mg/L and 5.0 mg/L is preferable for aerobic biodegradation and nitrification and more preferably, between 2.0 mg/L and 4.0 mg/L.

As the feed water 1 first entering the anoxic bioreactor 16 is high both in ammonia and COD but mainly utilized as a carbon source for denitrification. It is preferable that some of the feed water 1 is diverted to the aerobic bioreactor 17 through a second feed line not illustrated. For a complete denitrification, the ratio of carbon to nitrogen is preferable in the range of 3.0 to 10.0, more typically between 5.0 and 7.0. According to the said typical ratio, reasonable flowrate of feed water 1 may be directly pumped to the aerobic bioreactor 17 for ammonia nitrification and digestion of excessive COD. Such a modification is a further optimization of the process shown in FIG. 1 designed in accordance with the present invention.

Typically aerobic nitrification and biodegradation happen very rapidly in the aerobic bioreactor 17 while denitrification often occurs slowly in the anoxic bioreactor 16, therefore denitrification is the limiting step for overall rate of removal of total nitrogen throughout the process. From the viewpoint of bioreactor size optimization, it is preferable that the aerobic bioreactor 17 has a volume smaller than the anoxic bioreactor 16 so that the HRT in anoxic bioreactor 16 for denitrification is longer than that in the aerobic bioreactor 17. The ratio of said aerobic reactor volume to the said anoxic bioreactor volume is recommended as between 0.1 and 0.9, more preferably between 0.3 and 0.6. Inside the anoxic bioreactor (16), similarly, the lower compartment 41 for sludge storage prefers a larger capacity while the upper compartment 42 for sludge sedimentation requires a space only to house those inclined plates 37. The ratio of the capacity of upper compartment 42 to that of lower compartment 41 is thus preferable between 0.3 and 0.8, more preferably between 0.4 and 0.6.

The membranes (21) are cleaned through the inline chemical cleaning and complete out-of-system cleaning, wherein the incline chemical cleaning is performed at a fixed time interval and requires a diaphragm pump and a chemical solution container not illustrated but the out-of-system cleaning should be done in a separate membrane cleaning tank other than the aerobic bioreactor (17). Being filled with water or membrane manufacturer recommended chemical solutions, the permeate tank (12) can be used for such a purpose after a complete drain-off of permeate through outlet (11).

EXAMPLES

The present invention will be demonstrated by way of the following examples, but is in no way limited by these examples.

Example 1

A pilot was constructed in accordance with an embodiment of the present invention (see FIG. 1). Fed with the same wastewater as that treated in a large wastewater treatment plant in Tokyo, the said pilot was operated for 120 days. The anoxic bioreactor had a volume of 30 L and a HRT of 3 hours and was outfitted with 7 inclined plates arranged in parallel. The aerobic bioreactor had a volume of 30 L and a HRT of 3 hours and was furnished with a module of hollow fiber membranes having a surface area of about 1 $m^2$. The dissolved oxygen in anoxic bioreactor varied from 0.1 mg/L to 0.4 mg/L and in aerobic bioreactor, it was at most times fine-tuned within the range of 2.0 mg/L up to 4.0 mg/L. There was no discharge of excess sludge throughout the whole experiment except the amount for sludge sampling up to 200 mL per day. More specifically, the feed water had the following characteristics:

|  | Average | Range |
|---|---|---|
| COD, mg/L | 178 | 46-298 |
| Total Nitrogen, mg/L as N | 24.7 | 6.0-50 |
| Ammonia, mg/L as N | 18.1 | 3.0-35.2 |
| Suspended Solids, mg/L | 118 | 20-400 |
| Turbidity, NTU | 104 | 10-178 |

The seeding sludge taken from a wastewater treatment plant was subject to repeat concentration prior to being transferred into the anoxic and aerobic bioreactors. The pilot started with an anoxic sludge of 9.3 g/L as MLSS and 7.2 g/L as mixed liquor volatile suspended solids (MLVSS) and an aerobic sludge of 8.7 g/L as MLSS and 6.9 g/L as MLVSS.

Figure 3:
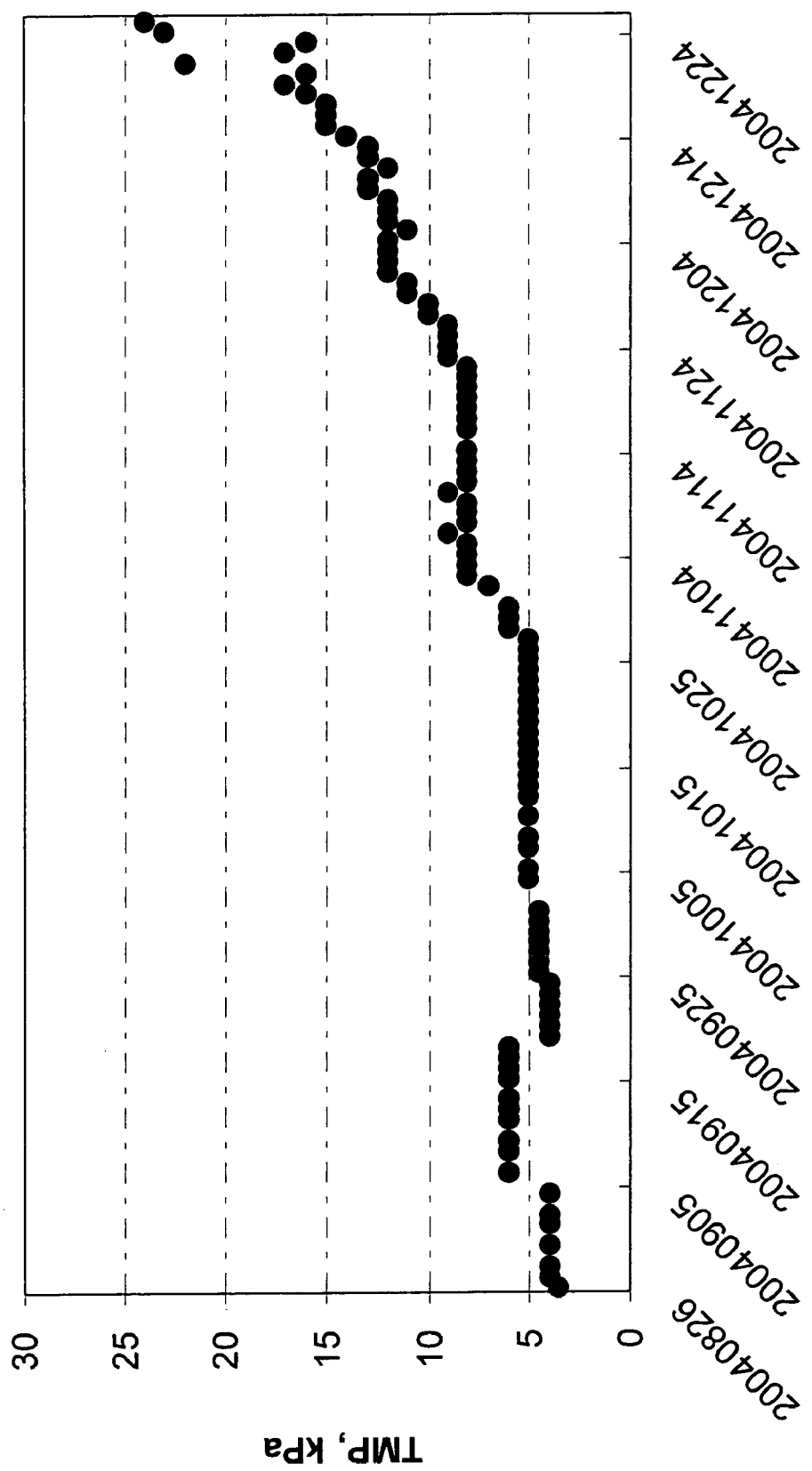
FIGS. 3, 4, 5, 6 and 7 are graphs showing the results of experiments conducted with an embodiment of the invention.

FIG. 3 shows the development of transmembrane pressure with the filtration time. Although no backwashing or cleaning was performed during the 120 days of pilot experiment, membrane module was successfully operated at a constant membrane flux of 0.24 m/d without serious membrane fouling. However, at the end of this experiment, a drastic increase of transmembrane pressure was observed within one week, indicating that a high aerobic sludge concentration may trigger membrane fouling stochastically.

Figure 4:
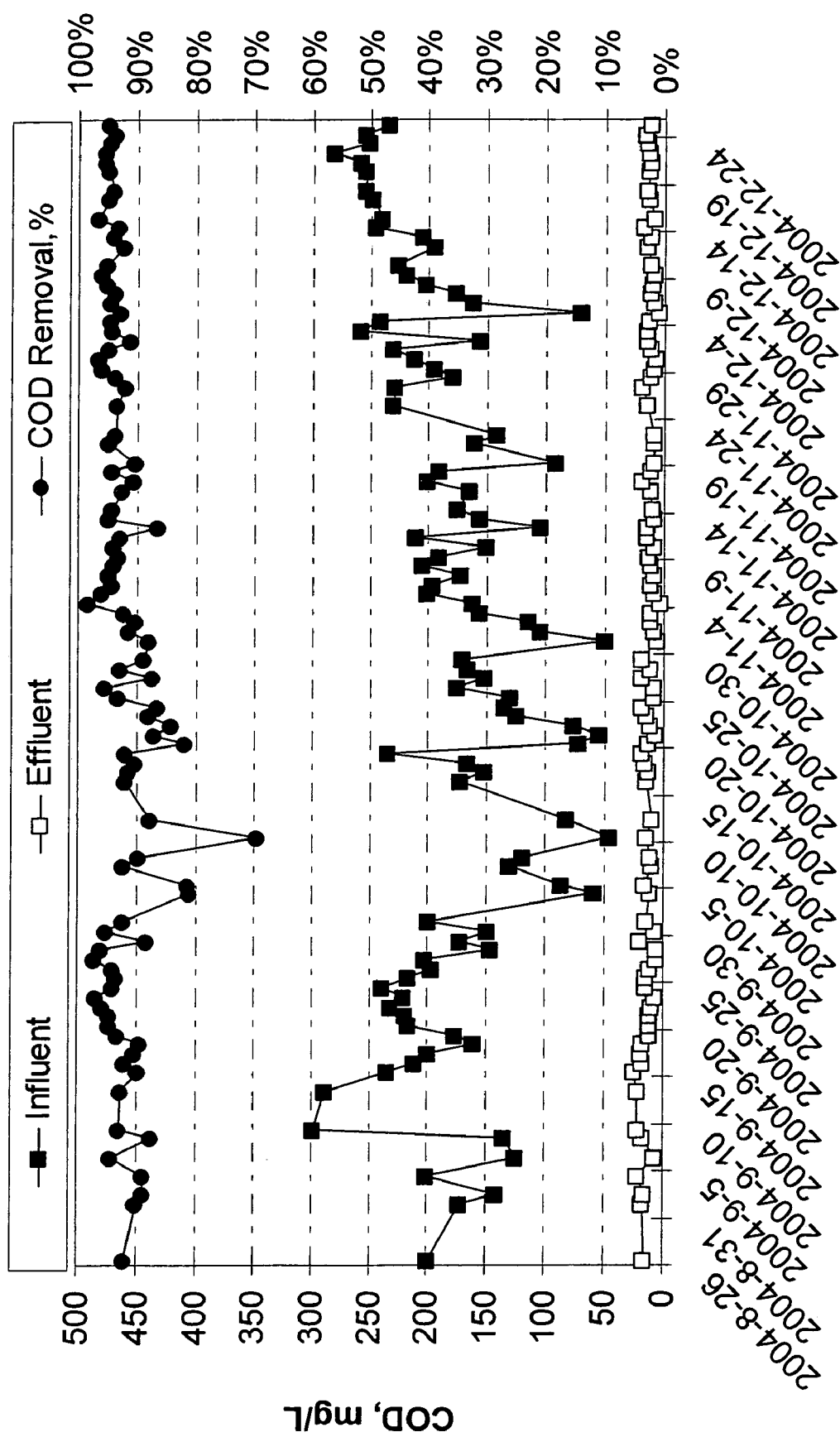
Figure 5:
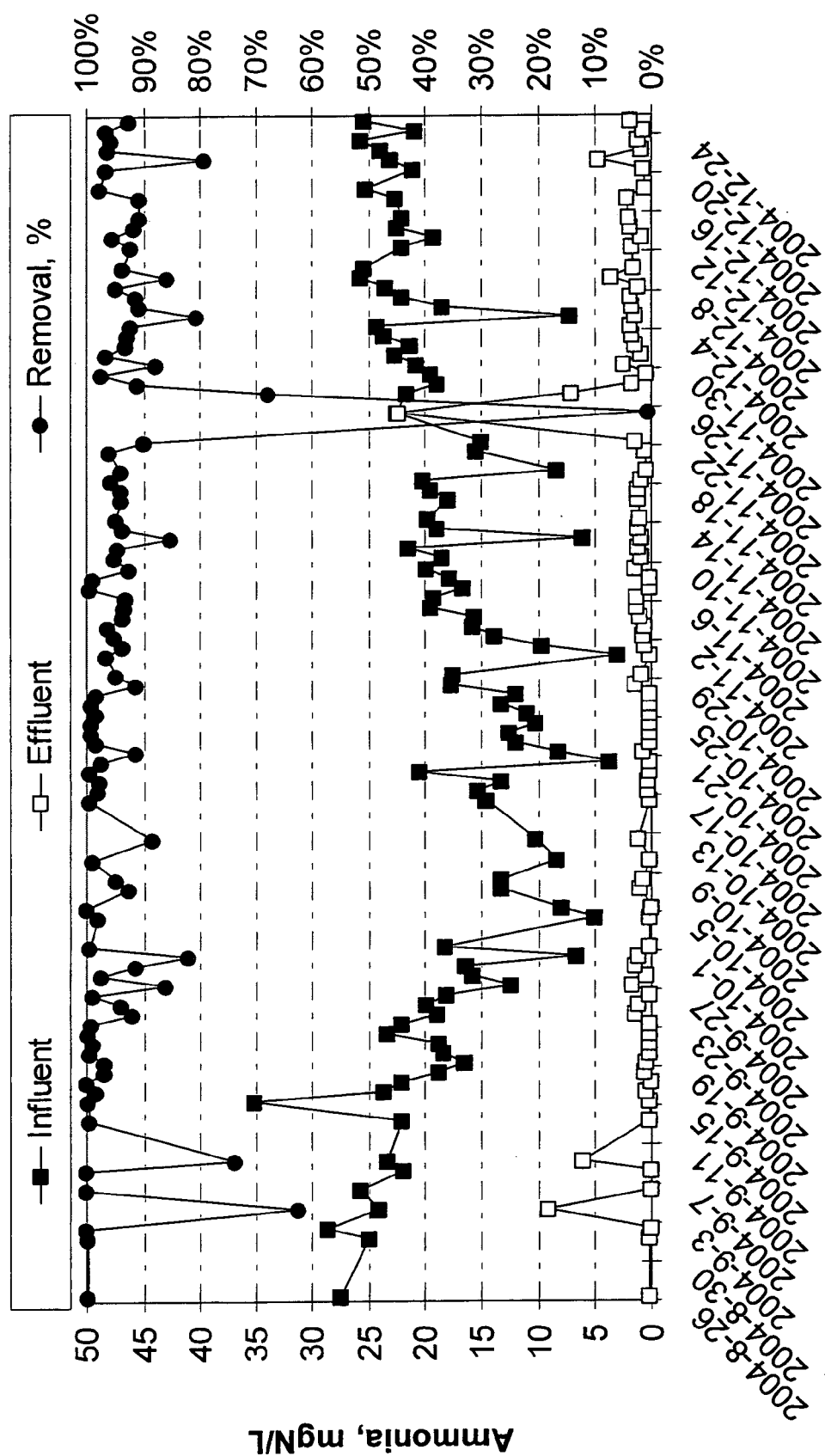
Figure 6:
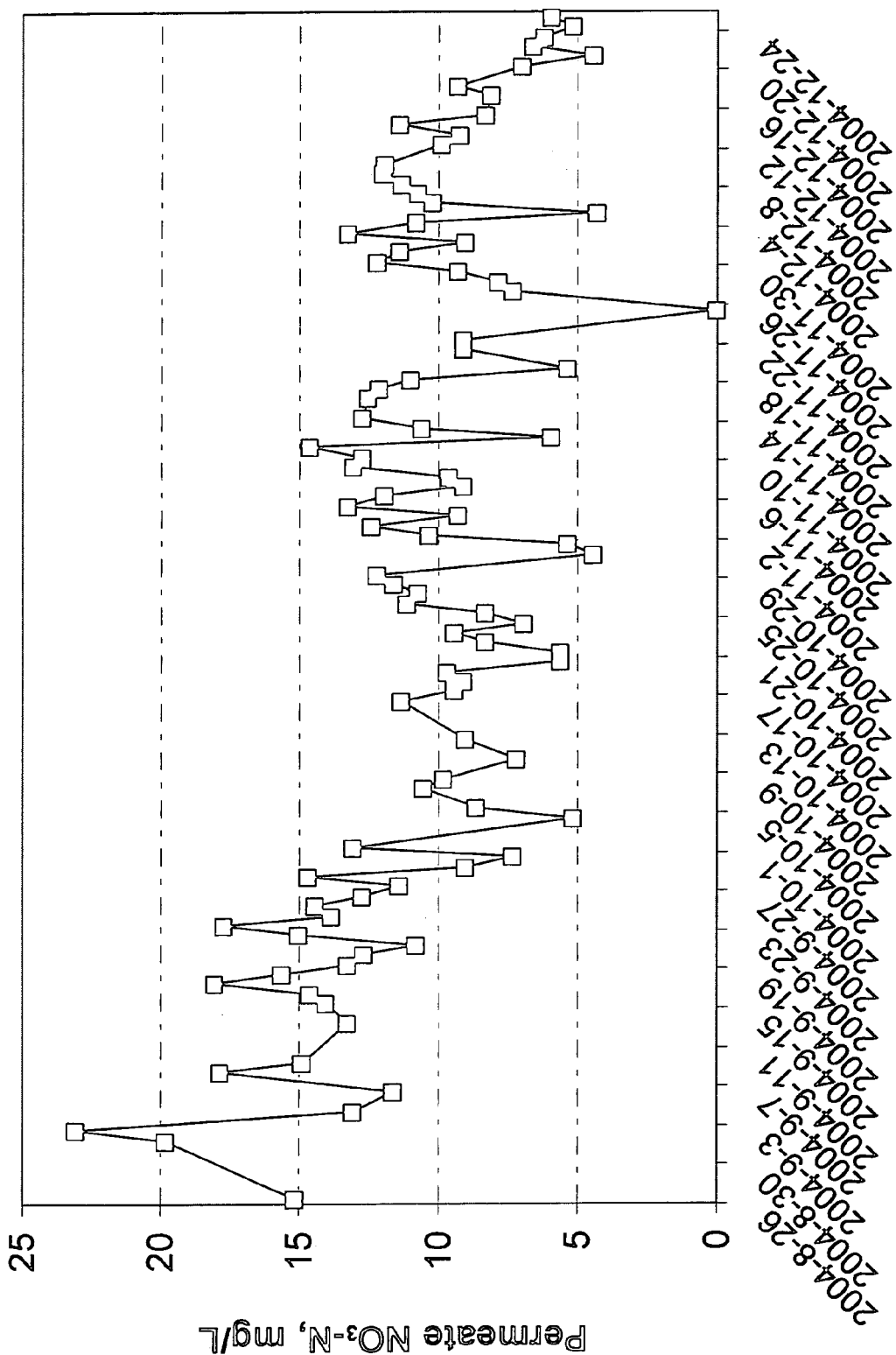

FIGS. 4, 5 and 6 present the long-term performance results regarding COD, ammonia, and nitrate, respectively, indicating that the process designed according to the invention was much efficient in nutrient removals. On average, COD was satisfactorily removed as high as 92.1% and the permeate COD was only 12.6 mg/L. Due to the perfect rejection of membranes, large quantities of nitrifers grew healthily and a high nitrification was therefore observed averagely at 93%. The ammonia nitrogen in permeate was found to be as low as 1.3 mg/L. In particular, on the day 2004 Nov. 25, an accidental stop of oxygenating air supply led to very low dissolved oxygen of only 0.4 mg/L in the aerobic bioreactor. As a consequence, nitrification was identified as low as 0.4%. However, after the oxygenating air supply resumed, nitrification was restored quickly within a couple of days, indicating the pilot was very much flexible to the shock of dissolved oxygen. As far as the permeate nitrate was concerned, the average level remained approximately 10.6 mg/L as nitrogen while during the last week of the pilot experiment, the permeate nitrate varied from 4.4 mg/L to 6.6 mg/L and its average attained to a record low of 5.6 mg/L.

Figure 7:
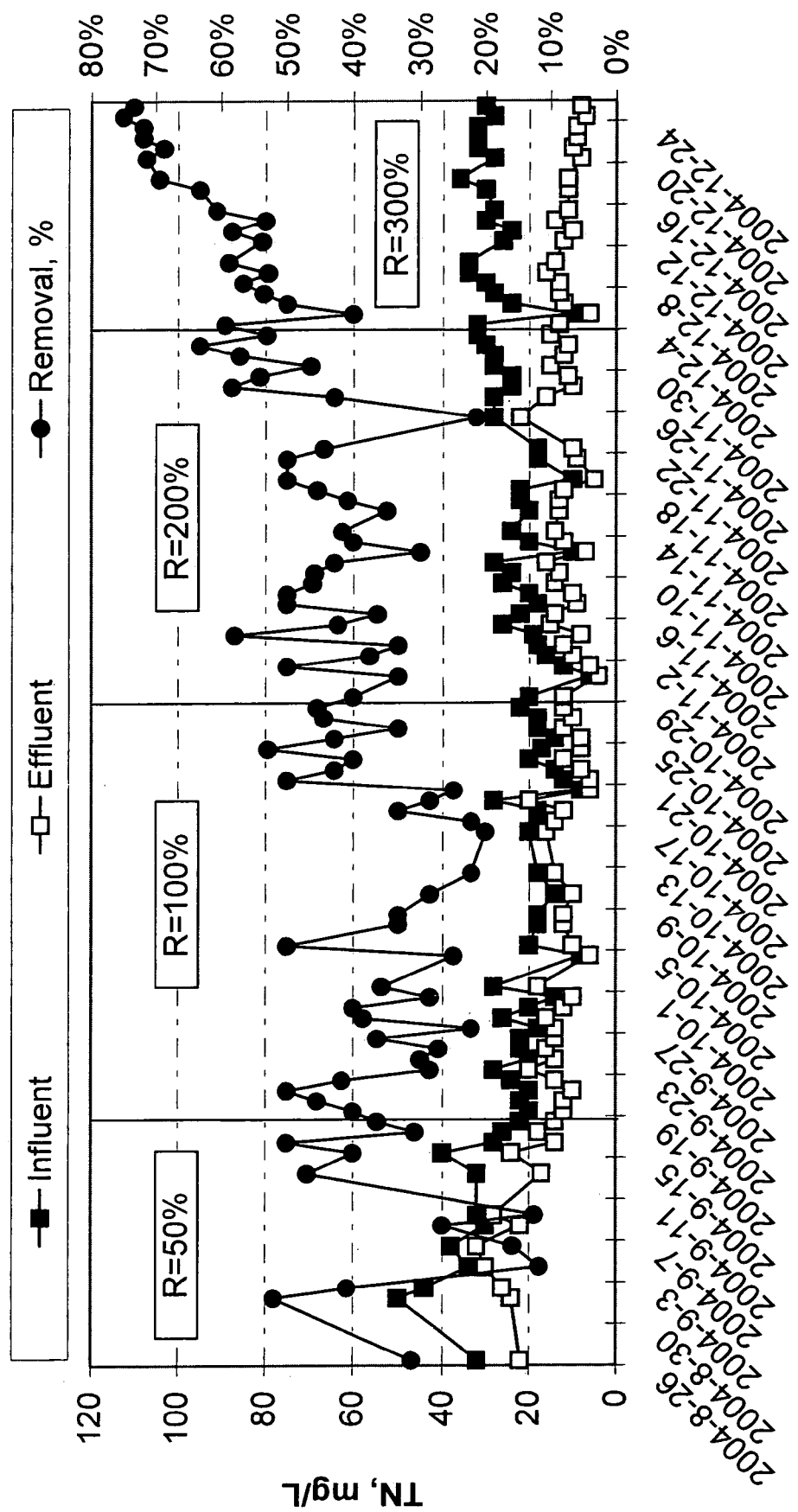

FIG. 7 shows variation of total nitrogen over the 120 days of pilot experiment. Total nitrogen removal efficiencies were found on average 34.3%, 35.2%, 45.3% and 63.3% at selected recycle ratios 50%, 100%, 200% and 300%, respectively. It should be noted that recycle ratio of 50%, average removal of total nitrogen was 34.3% greater than the theoretical maximum removal of 33.3%. Such a removal was attributed to an accidental loss of sludge from the aerobic sludge recycle line (see FIGS. 8 and 9 for more information about the sudden change of sludge concentrations). For a wastewater treatment plant, higher denitrification was at all times preferred in order to prevent surface waters from serious eutrophication. A further review on the last week's data in FIG. 7 indicates that total nitrogen removal reached 72% and permeate total nitrogen was kept at 8.5 mg/L on a daily average basis, which is lower than the maximum value of 10 mg/L permitted in many jurisdictions. For example, the USEPA has set a maximum drinking water standard for nitrate as nitrogen at 10 mg/L. At higher levels, nitrate as nitrogen in water can cause serious illness in infants less than 6 months of age but is not considered harmful to older children or adults.

Figure 8:
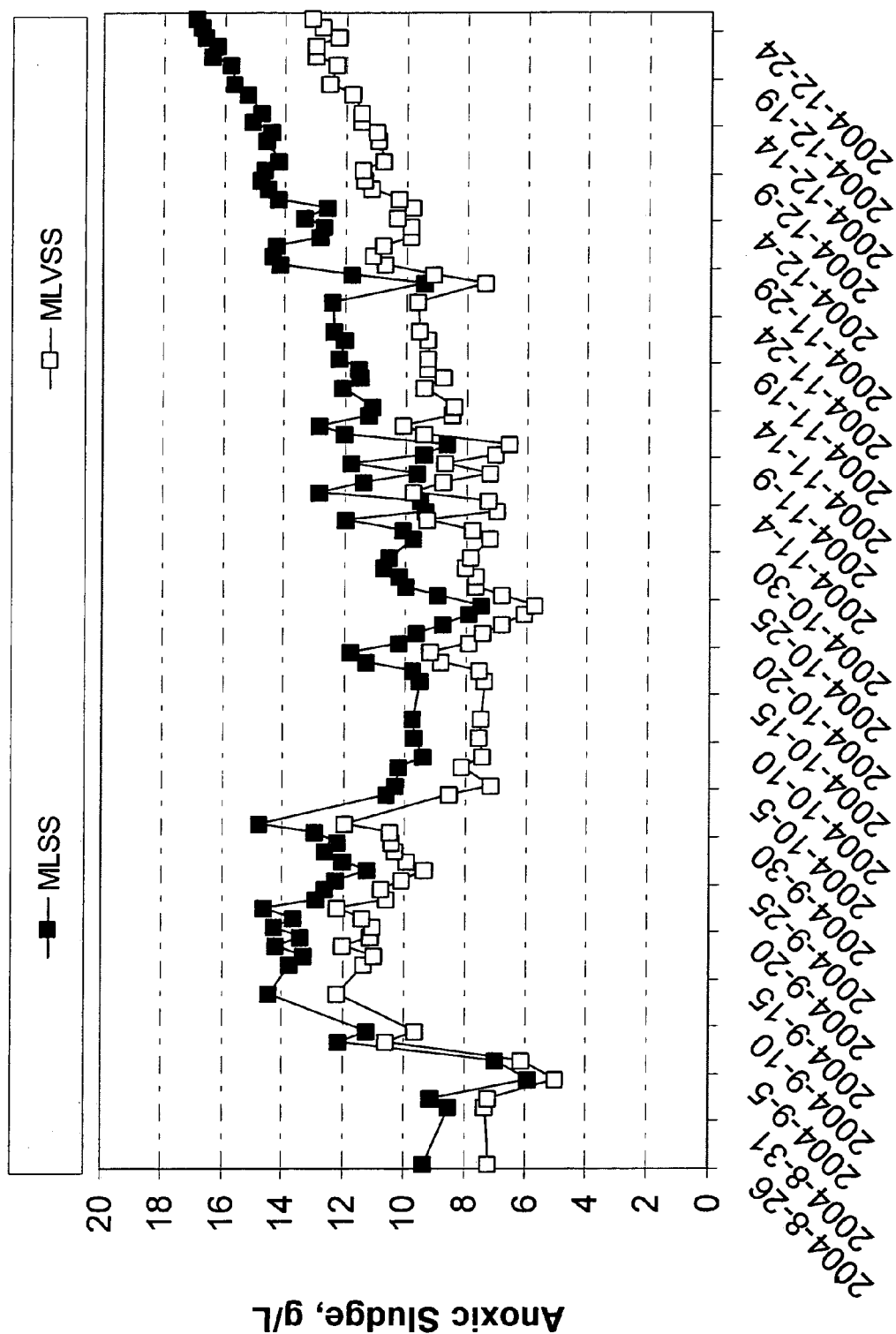
FIGS. 8 and 9 are graphs showing the results of experiments regarding the evolution of sludge in aerobic and anoxic tanks conducted with an embodiment of the invention.
Figure 9:
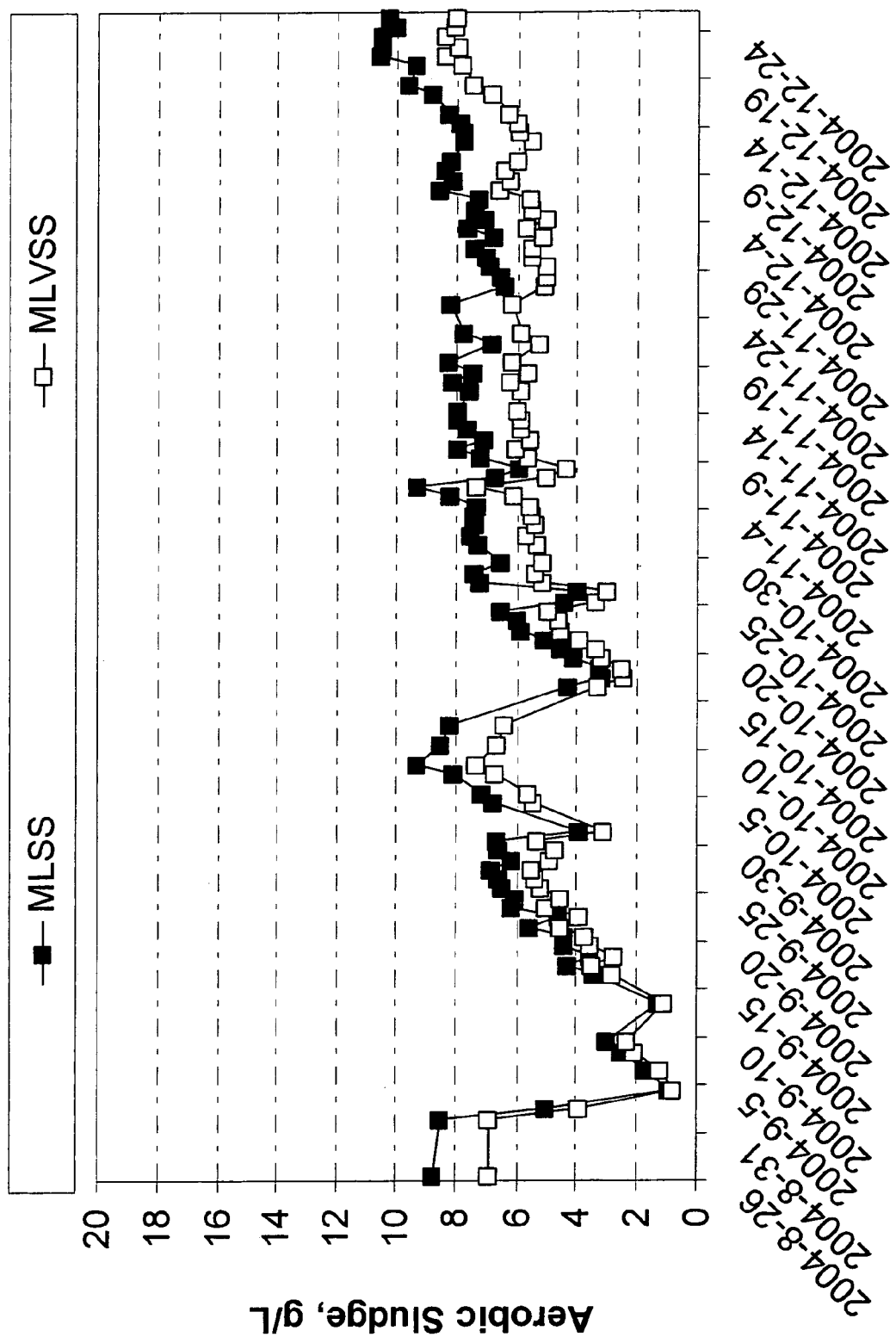

FIGS. 8 and 9 show sludge concentrations in the aerobic and anoxic bioreactors over the duration of the pilot experiment. By the use of inclined plates, the anoxic sludge usually exceeded 10 g/L MLSS while in the aerobic bioreactor; sludge concentrations were at most times kept within 10 g/L as MLSS, which is the safer than the guideline for membrane bioreactors set by a specialist committee from Japan Ministry of Construction. The difference in sludge concentration between aerobic and anoxic bioreactors was observed in the range of 0.1 g/L up to 13.1 g/L as MLSS and on average about 5.3 g/L as MLSS. In particular, during the last week of the pilot experiment, the aerobic sludge remained at and only slightly more than 10 g/L as MLSS when the anoxic sludge approached 17 g/L as MLSS. It's believed that the introduction of unique inclined plates according to the present invention has enabled membrane bioreactor to successfully operate at zero excess sludge discharge or at extremely high sludge concentrations.

Example 2

Figure 10:
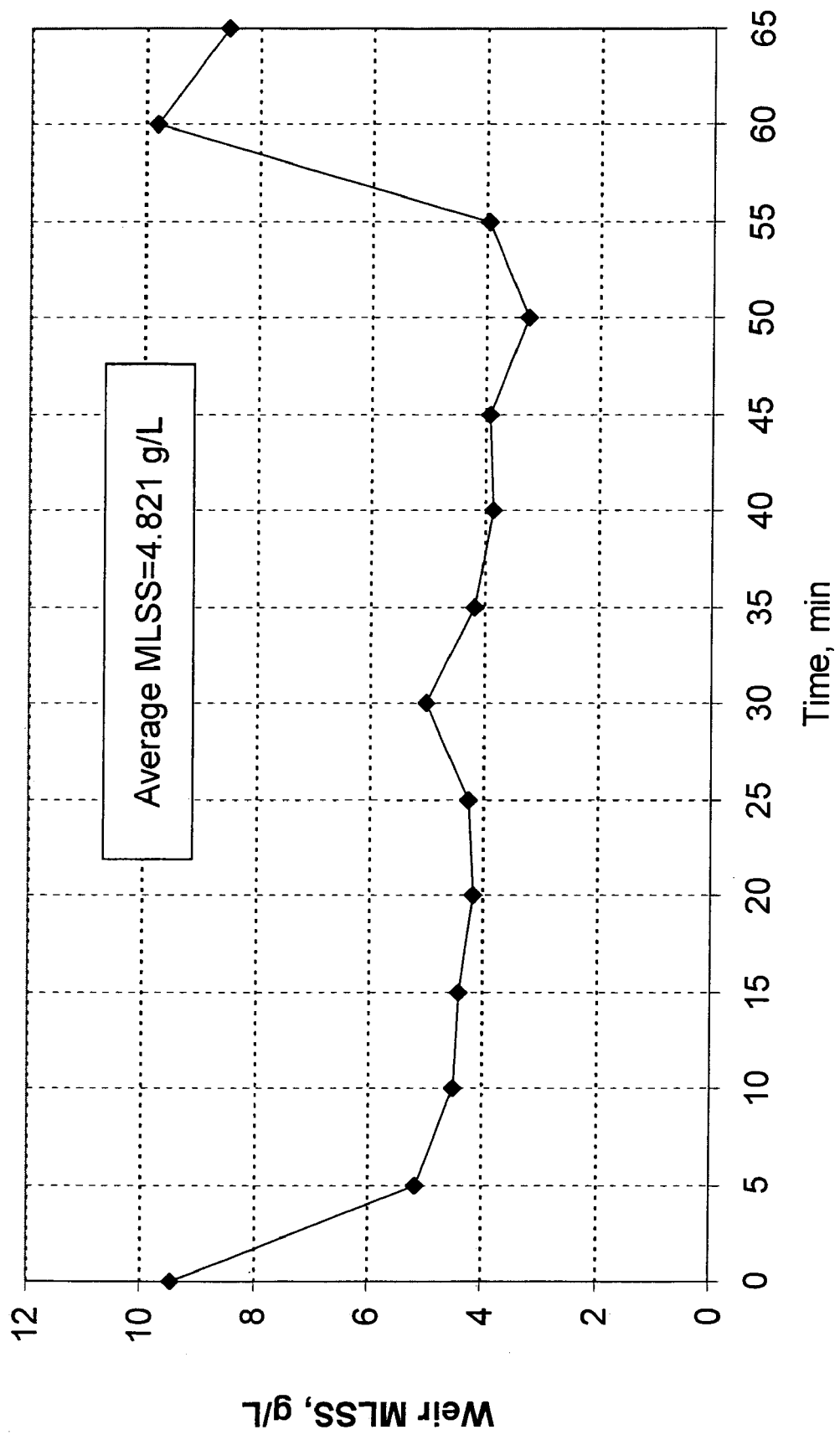
FIG. 10 is a graph showing the result of experiment regarding the change of weir sludge concentration with time conducted with an embodiment of the invention.

A batch test was conducted with the same pilot illustrated in FIG. 1 to investigate the variation of weir MLSS over a single cycle of air blowing. During the batch test, the cycle ratio remained constant at 300%. The anoxic sludge had an average concentration of 9.45 g/L as MLSS while the air blowing was set at 10 L normal air 20° C. per minute for a 2-minute ON and 60-minute OFF cycle. As shown in FIG. 10, the weir MLSS became relatively stable within 5 minutes since the air blowing stopped, indicating that the anoxic sludge sedimentation could occur very fast with the aid of inclined plates. The average of weir MLSS over the 60-minute OFF cycle was found to be about 4.8 g/L, which further confirmed the effectiveness of the inclined plates as a settling promoter.

Example 3

Figure 11:
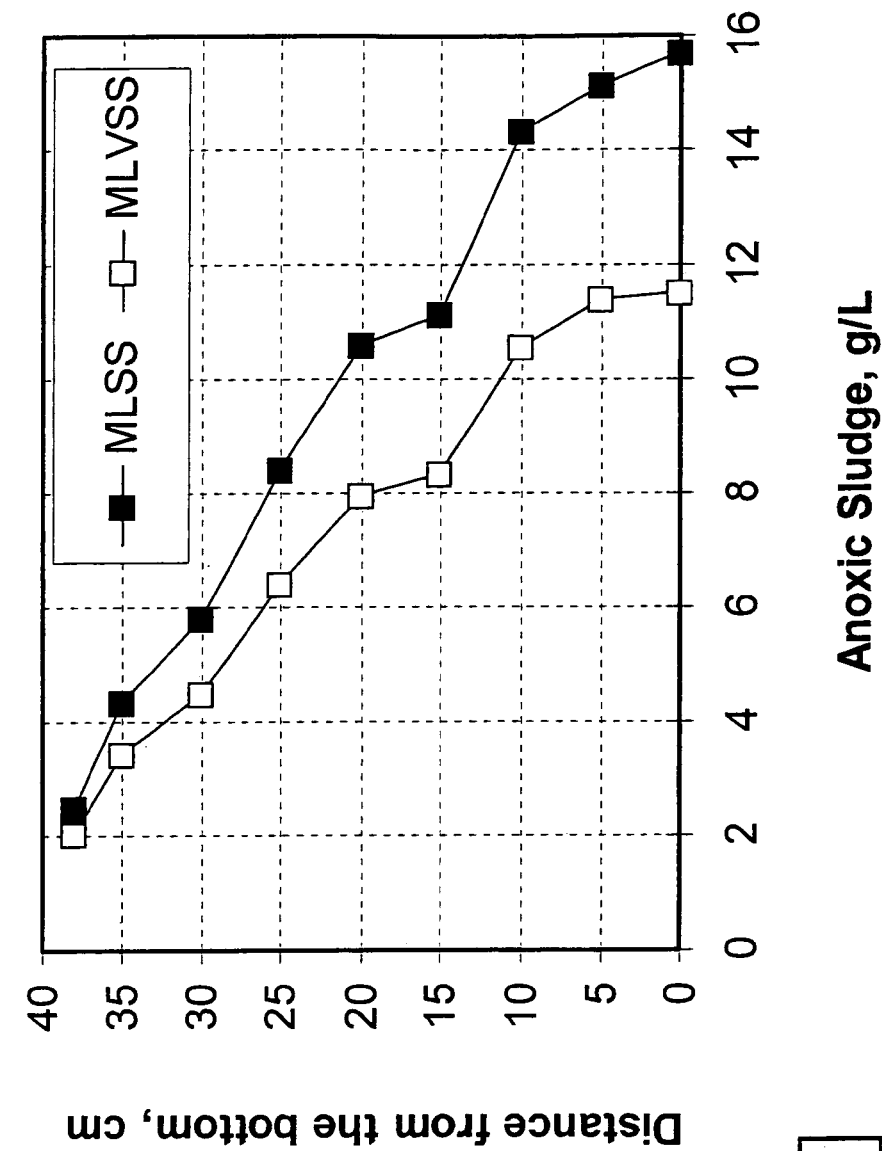
FIG. 11 is a graph showing the result of experimental regarding the distribution of sludge concentration within the anoxic tank conducted with an embodiment of the invention.
Figure 11:
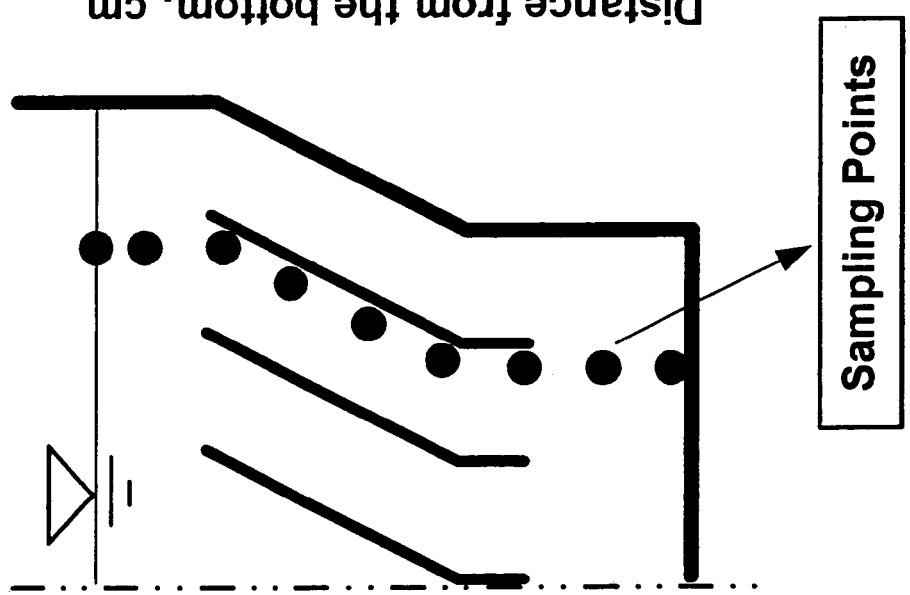

Another batch test was conducted with the same pilot illustrated in FIG. 1 and aimed at the vertical distribution of anoxic sludge concentration in the 60-minute OFF air blowing cycle. Prior to this batch test, the pilot fed with actual wastewater had been in operation for about three weeks. The HRT was kept at 10 hours and no excess sludge was discharged except for grab sampling at a flowrate of 40 mL/day. At the time of batch test, average sludge concentration was approximately 10 g/L as MLSS in the anoxic bioreactor. Air blowing was actuated at 12 L normal air 20° C. per minute for a 2-minute ON and 60-minute OFF cycle. FIG. 11 shows a typical profile of vertical distribution of anoxic MLSS and indicates that two poles of anoxic MLSS, namely the lowest of 2.5 g/L and the highest of 15.7 g/L, were identified at the top surface and the bottom area. Along the up-to-down of an inclined plate, there was a gradual increase in anoxic MLSS resulting from gravity sedimentation. After entering the sludge storage compartment, however, this increment tendency became insignificant. Such a difference may further demonstrate that the inclined plates has improved the sludge settling not only by providing a larger area but also through the mechanism illustrated in FIG. 2.

Example 4

The third batch test was conducted in parallel with the pilot experiment as described in Example 1 and directed at the effect of air blowing on MLSS difference between aerobic and anoxic bioreactors. During the batch test, the recycle ratio was set at 100% and HRT was kept constant at 6 hours. No excess sludge was discharged from the two bioreactors throughout the experiment.

Figure 12:
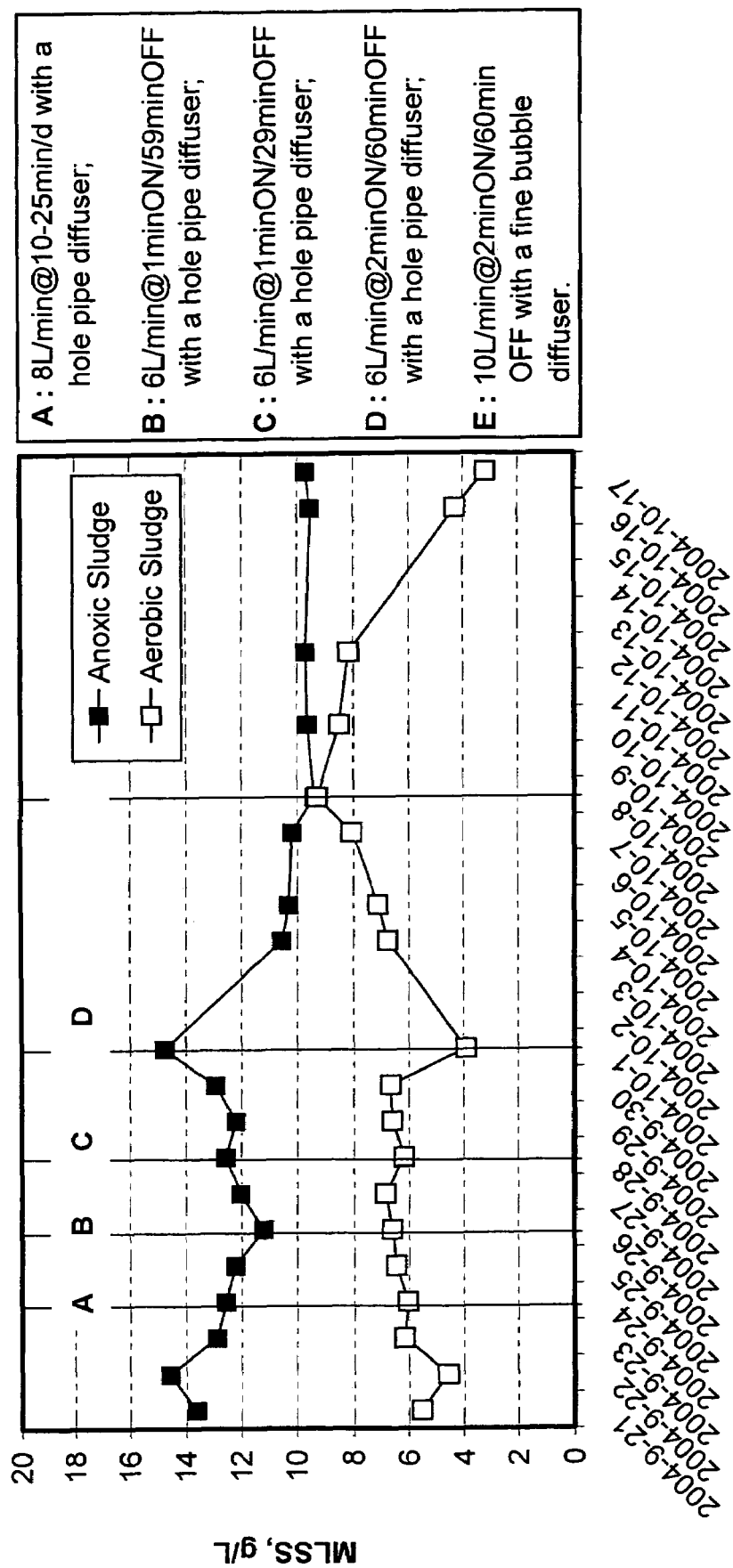
FIG. 12 is a graph showing the result of experimental regarding the effect of blowing to anoxic bioreactor on the sludge concentration in aerobic bioreactor conducted with an embodiment of the invention.

FIG. 12 shows the result regarding the effect of different settings of air blowing and indicates that both hole pipe diffuser and fine bubble diffuser could be much effective to alter the MLSS concentration in anoxic and aerobic bioreactors. However, their corresponding requirements for air flowrate and duration were different. Relatively, a fine bubble diffuser asks for high flowrate of air blowing due to the fact that small diameter bubbles produce less turbulence than large ones. For example, on the day the setting D applied, the MLSS difference between two bioreactors was 10.86 g/L. After one week of air blowing with a holed pipe diffuser at 6 L/min for 2-minute ON and 60-minute OFF, however, this difference approached zero day by day. Then a fine bubble diffuser was introduced with setting E (i.e., with an increased blowing air flowrate), the MLSS difference between two bioreactors became larger and larger gradually during next 10 days and finally reached as high as 6.54 g/L.

From above results it could be concluded that the setting of air blowing to anoxic bioreactor, in particular the type of diffuser, the air flowrate and the duration of blowing, played an important role in controlling the MLSS difference between the aerobic and anoxic bioreactors. In other words, the air blowing provided a much flexible tool to maintain a desired aerobic MLSS concentration during the long-term operation of membrane bioreactors at zero discharge of excess sludge.

It will be understood that what has been described herein are preferred embodiments in accordance with the present invention. The invention nonetheless is susceptible to and may be effected by certain changes in form and details and alternative embodiments fully comprehended by the spirit of the invention as described above, and the scope of the claims appended below.

What is claimed is:

1. An inclined plate coupled membrane bioreactor comprising,
   (a) an anoxic bioreactor (16) outfitted with required outlets and inlets for outgoing and incoming exchanges in the form of gas, liquid or solids;
   (b) an aerobic bioreactor (17) outfitted with required outlets and inlets for outgoing and incoming exchanges in form of gas, liquid or solids;
   (c) a single or an array of inclined plates (37) placed at an upper compartment (42) of the anoxic bioreactor;
   (d) a single weir or a multiple weir system (25) in association with said anoxic bioreactor (16);
   (e) a membrane or a bank of membranes (21) submerged into aerobic sludge (50) either vertically or inclinedly to the bottom of said aerobic bioreactor (17).

2. The inclined plate coupled membrane bioreactor of claim 1 further comprising a holed plate flow regulator having a hole (40) size of 5 mm up to 100 mm.

3. The inclined plate coupled membrane bioreactor of claim 1 further comprising a slow agitator (39) which is in continuous operation at a speed of 10 rounds per minute to 1000 rounds per minute.

4. The inclined plate coupled membrane bioreactor of claim 1 wherein a volume ratio of aerobic bioreactor (17) to anoxic bioreactor (16) is between 0.1 and 0.9.

5. The inclined plate coupled membrane bioreactor of claim 1 wherein a volume ratio of the upper compartment (42) to a lower compartment (41) of the anoxic bioreactor is between 0.3 and 0.8.

6. The inclined plate coupled membrane bioreactor of claim 1 wherein the angle of inclined plates is movable between 30 degrees to 150 degrees.

7. The inclined plate coupled membrane bioreactor according to claim 6, wherein the inclined plates (37) move from an initial inclined angle (35) to its supplementary angle at a speed of 0.01 degree per second to 10 degrees per second and at a frequency of once every 30 minutes to once every week, depending on a pileup of anoxic sludge at the foot of the inclined plates (37).

8. A process for treating wastewater (1) in an inclined plate coupled membrane bioreactor comprising the steps of:
   (a) feeding the wastewater (1), either directly or subject to mixing with recycled aerobic sludge (50), into a lower compartment (41) of an anoxic bioreactor (16) where biological processes convert the wastewater (1) and the recycled aerobic sludge (50) from a downstream aerobic bioreactor (17) into mixed liquor or anoxic sludge (43) in the absence of sufficient free oxygen; and
   (b) providing a single or an array of inclined plates (37) at an upper compartment (42) of the bioreactor (16) to achieve the desired sedimentation of the mixed liquor or the anoxic sludge (43) through a mechanism of offering larger sedimentation area and promoting the formation of counterflows between two adjacent plates (60, 61); and
   (c) providing a weir (25) through which the top supernatant (48) of the anoxic sludge (43) is collected and transferred to the downstream aerobic bioreactor (17); and
   (d) feeding weir effluent (51) into the aerobic bioreactor (17) in which aerobic biological processes convert the weir effluent (51) into a mixed liquor or the aerobic sludge (50); and
   (e) providing a single membrane or a bank of membranes (21) submerged in the aerobic sludge (50) so that hollow fiber membranes (21) can withdraw permeate (13) from the aerobic sludge (50) to the membrane lumens (23) through a permeate line (19) under a substantial negative pressure; and
   (f) providing both continuous air scouring bubbles (22) and air oxygenating bubbles (29) upwards to mitigate possible fouling of the membranes (21) and to maintain an aerobic microenvironment for the said aerobic sludge (50); and
   (g) recycling nitrate enriched aerobic sludge (50) to the lower compartment (41) via an inlet (3) at a designed recycle ration for continuous denitrification.

9. The process of claim 8 further comprising blowing intermittent air to the anoxic bioreactor (16) at 0.1 $m^3$-0.5 $m^3$ normal air 20° C. per square meter section area per minute for a 1 min-30 min ON and 10 min-120 min OFF cycle.

10. The process of claim 8 wherein a diffuser (33) employed for blowing air to the anoxic bioreactor (16) produces coarse bubbles having an average diameter of 1 mm to 50 mm.

11. The process of claim 8 wherein the weir effluent (51) is transferred to the downstream aerobic bioreactor (17) by either gravity flow or pressurized flow, depending on actual altitudinal location.

12. The process of claim 8 wherein the continuous air scouring to membranes (21) is provided at 0.1 m³-0.8 m³ normal air 20° C. per square meter section area per minute.

13. The process of claim 8 wherein the membranes form a membrane module (24) that is submerged into the aerobic bioreactor (17) either vertically or inclinedly.

14. The process of claim 8 wherein the aerobic bioreactor (17) has a HRT of 1.0 hour to 5 hours, and the anoxic bioreactor (16) has a HRT of 2.0 hours to 10 hours.

15. The process of claim 8 wherein the SRT is kept such that no excess sludge is withdrawn from both reactors.

16. The process according to claim 8, wherein a source for air is fresh air or oxygen-depleted air (46) collected by a hood (18) suspended above water surface (30) of the aerobic bioreactor (17).

* * * * *

UNITED STATES PATENT AND TRADEMARK OFFICE
CERTIFICATE OF CORRECTION

PATENT NO. : 7,311,833 B2 Page 1 of 1
APPLICATION NO. : 11/070134
DATED : December 25, 2007
INVENTOR(S) : K. Yamamoto et al.

It is certified that error appears in the above-identified patent and that said Letters Patent is hereby corrected as shown below:

On Title page

| COLUMN | LINE | ERROR |
|---|---|---|
| item (76) Pg. 1, col. 1 | Inventors | "Tronto," should read --Toronto-- |
| item (57) Pg. 1, col. 2 | Abstract 8-9 of text | "An air oxygenating and an air scouring are continuously provided" should read --Air oxygenating and air scouring are continuously provided-- |
| item (57) Pg. 1, col. 2 | Abstract 12 of text | before "intermittent air blowing", delete "an" |
| item (57) Pg. 1, col. 2 | Abstract 16 of text | "of anoxic bioreactor" should read --of the anoxic bioreactor-- |
| 11 (Claim 1, | 53 line 8) | "in form of gas," should read --in the form of gas,-- |
| 14 (Claim 16, | 5 line 3) | "above water surface" should read --above the water surface-- |

Signed and Sealed this

Sixth Day of May, 2008

JON W. DUDAS
*Director of the United States Patent and Trademark Office*